(12) United States Patent
Shimizu et al.

(10) Patent No.: US 7,850,525 B2
(45) Date of Patent: Dec. 14, 2010

(54) MECHANISM OF GENERATING A SOUND RADAR IMAGE IN A VIDEO GAME DEVICE

(75) Inventors: Toru Shimizu, Tokyo (JP); Takao Hirabayashi, Tokyo (JP)

(73) Assignee: Sega Corporation, Tokyo (JP)

( * ) Notice: Subject to any disclaimer, the term of this patent is extended or adjusted under 35 U.S.C. 154(b) by 751 days.

(21) Appl. No.: 11/596,001

(22) PCT Filed: Mar. 10, 2005

(86) PCT No.: PCT/JP2005/004229
§ 371 (c)(1),
(2), (4) Date: Jul. 6, 2007

(87) PCT Pub. No.: WO2005/107903

PCT Pub. Date: Nov. 17, 2005

(65) Prior Publication Data
US 2007/0293313 A1 Dec. 20, 2007

(30) Foreign Application Priority Data
May 10, 2004 (JP) .............................. 2004-140330

(51) Int. Cl.
*A63F 9/24* (2006.01)
(52) U.S. Cl. .............................. 463/31; 463/30; 463/32; 463/33; 463/34; 463/35
(58) Field of Classification Search .............. 463/30–35
See application file for complete search history.

(56) References Cited
U.S. PATENT DOCUMENTS
5,771,041 A 6/1998 Small 6,760,050 B1 7/2004 Nakagawa (Continued)

FOREIGN PATENT DOCUMENTS

EP 0777209 6/1997

(Continued)

OTHER PUBLICATIONS

Supplementary European Search Report issued on Jun. 22, 2007 for European application No. 05720500.

(Continued)

*Primary Examiner*—Pierre E Elisca
(74) *Attorney, Agent, or Firm*—Finnegan, Henderson, Farabow, Garrett & Dunner, LLP

(57) ABSTRACT

An aspect of the present invention includes processes for detecting an event input, inputted as an operation signal, and determining sound characteristic information and sound effects corresponding to the event input, obtaining a first sound source position coordinates information in which a location where an event occurred in a virtual space is taken, determining a propagation mode of a sound to be produced corresponding to the event input in the virtual space based on sound characteristics information and the first sound source position coordinates information, determining a second sound source position coordinates information indicating a position of a sound source on the radar image based on the first sound source position coordinates information, and displaying a sound wave image indicating a propagation mode of the sound effect on the radar image based on the propagation mode of the sound and the second sound source position coordinates information.

12 Claims, 6 Drawing Sheets

U.S. PATENT DOCUMENTS

| | | |
|---|---|---|
| 2003/0032478 A1* | 2/2003 | Takahama et al. ............. 463/30 |
| 2006/0046844 A1* | 3/2006 | Kaneko ........................ 463/32 |
| 2007/0218966 A1* | 9/2007 | Tilston et al. .................. 463/5 |
| 2008/0194328 A1* | 8/2008 | Shimizu et al. ................ 463/34 |
| 2009/0015588 A1* | 1/2009 | Nagayama et al. ........... 345/426 |
| 2009/0069095 A1* | 3/2009 | Uno .............................. 463/43 |
| 2010/0099470 A1* | 4/2010 | Chosogabe .................... 463/1 |

FOREIGN PATENT DOCUMENTS

| | | |
|---|---|---|
| JP | 10-263205 | 10/1998 |
| JP | 11-272156 | 10/1999 |
| JP | 2000-231644 | 8/2000 |
| JP | 2004-113355 A | 4/2004 |
| JP | 2004-154449 A | 6/2004 |

OTHER PUBLICATIONS

Yugen Kaisha Karitajian, Konami Official Guide, Konami Koshiki Perfect Guide Series Metal Gear Solid 2 Substance Konami Koshiki Perfect Guide, 1$^{st}$ edition, Konami Co., Ltd., pp. 8-9, 15 & 67 (Mar. 30, 2003).

Japanese Patent Office Notice of Reasons for Rejection for Application No. 2006-512920 Mailed Jul. 23, 2010 (10 pages total).

* cited by examiner

MECHANISM OF GENERATING A SOUND RADAR IMAGE IN A VIDEO GAME DEVICE

TECHNICAL FIELD

The present invention relates to electronic game devices, data processing methods in electronic game devices, and programs for executing such methods on a computer, and particularly relates to electronic game devices in which a game application program uses the propagation of sound to determine how easy a player character is discovered by enemy characters and the result thereof is displayed on display means which is different from a main screen.

BACKGROUND

In a known game program, a radar function is used to discover enemy characters which are defined as opponents in the game application program. For example, JP H10-263205-A discloses a game device in which a video image showing a soccer game as seen from a viewpoint defined within a virtual space is displayed at the center of a screen and a small-sized radar screen is displayed independently of this background screen. In this game device, the viewpoint moves from the rear side of a player character which advances toward a ball, and the video image centered around this viewpoint is displayed on the entire screen. At this time, it is quite difficult for a game-player to know the positional relationships between the player character being operated by the game-player and teammates and opponent players who are present around the player character.

Accordingly, a radar image is configured so as to be centered around the player character and to indicate the positional relationships between the player character and the teammates and opponent players, and this radar image is displayed on a monitor different from the main screen.

In military applications, radar display methods are applied to target acquisition techniques using sound. In active sonar, reflected waves of sound, emitted from a warship, propagating through water are received by a receiver of the warship to detect other ships and specify their positions. Since the state of sound propagation varies depending on water flow and temperature, correction is applied to the received data. The sound propagation state is displayed on a display screen of a control device as a radar screen. It should be noted that, in passive sonars, sound waves are not actively emitted from the warship, but rather, sound produced from other ships is received by a sound detector and the positions of the other ships are specified.

[Patent Document 1] Japanese Unexamined Patent Application Publication H10-263205

There are conventional games in which enemy characters arranged within at least a predetermined range in a game space react to a sound effect that is produced in response to an event caused by a player input and the enemy characters, who had been on standby up until that point of time, begin to attack the player character ("Bonanza Bros.," a commercial game by Sega Corporation in 1990). Since the movements of the enemy characters therein were changed in response to the occurrence of an event itself, it was not actually determined whether or not the sound that had been produced by the actual event had in fact reached the enemy characters (whether or not it was heard by the enemy characters), which has given a game-player a sense of unnaturalness when an event occurred and all the enemies within the predetermined range reacted regardless of their distances from the source of the sound.

SUMMARY

Problems to be Solved by the Invention

Accordingly, it is an object of the present invention to provide: a game application program which can provide a game-player with an appropriate indicator indicating the extent to which opponents perceive a sound produced from an object operated by the game-player, thereby enabling the game-player to appropriately operate objects to be operated; a data processing method for electronic amusement devices for executing the game application program and an electronic amusement device.

Means for Solving the Problems

In order to achieve this object, the present invention involves image processing technologies applied to an electronic amusement device comprising a memory in which a game program is stored, an operation terminal that is operated by a game-player, and a data processing device that executes data processing for electronic amusement based on operation data from the operation terminal and the game program and executes processing for outputting the processing result to display means.

That is, the present invention is directed to executing sound radar image processing for creating a sound radar image representing propagation of sound based on the program and operation data and displaying this image on the display means, wherein the sound radar image processing comprises: sound source coordinate position setting that sets a coordinate position of a sound source in a virtual three dimensional space defined by the game program; sound characteristics setting that sets a parameter relating to a characteristic of a sound produced from a sound source; sound propagation mode setting that sets a propagation mode of a sound in the virtual space based on the sound source coordinate position and sound characteristics parameters; sound propagation mode display processing for displaying the sound propagation mode on the display means different from a main screen; target body symbol display processing that obtains a position, with respect to the sound source position, of a target body defined as an opponent of the game-player in the game program and based on this positional relationship displays the target body symbol on the sound propagation mode display image; and overlap determination processing that determines an overlap between the position of the target body in the virtual space and the sound propagation range.

Moreover, the present invention involves a data processing method in a game, wherein by a CPU executing a game program and through control of an action and a position of a player character in a virtual space based on an event input that is inputted based on operation signal from operation means operated by a game-player, the game is advanced, and an image of the game is displayed on display means, and a radar image, which indicates a relative positional relationship between the player character and objects arranged in a predetermined range thereabout in the virtual space, is displayed on the display means, the data processing method comprising:

1) a step of detecting the event input that is inputted by the operation signal and determining sound characteristic information and sound effects corresponding to the event input;

2) a step of obtaining a first sound source position coordinates information in which a location where the event occurred in the virtual space is taken as a sound source position;

3) a step of determining a propagation mode of a sound to be produced corresponding to the event input in the virtual space based on the sound characteristics information and the first sound source position coordinates information;

4) a step of determining a second sound source position coordinates information indicating a position of a sound source on the radar image based on the first sound source position coordinates information; and 5) a step of displaying a sound wave image indicating a propagation mode of the sound effect on the radar image based on the propagation mode of the sound and the second sound source position coordinates information.

Moreover, another embodiment of the present invention further includes:

6) a step of arranging an enemy character in the virtual space and controlling an action and position of the enemy character, and displaying on the radar image a symbol indicating a relative positional relationship in the virtual space between the player character and the enemy character, 7) a step of obtaining position coordinates information of the enemy character in the virtual space, 8) a step of judging whether or not the enemy character is present in a reachable range of a sound produced corresponding to the event input based on the position coordinates information of the enemy character, the sound characteristics information, and the first sound source position information, and 9) a step of changing a parameter relating to an action of the enemy character when a determination is made in the 8) process that the enemy character is present within the reachable range of the sound.

ADVANTAGEOUS EFFECT OF THE INVENTION

The present invention can provide a game application system that is capable of: displaying the propagation state of a sound on a screen different from a main screen; displaying a symbol of an opponent in an image of a sound propagation mode, and determining an overlap between the region of sound propagation and the position of the opponent; and, by setting an extent to which the opponent perceives a sound source based on the determination result and determining an action mode of the opponent based on the extent of the perception, providing the game-player with an appropriate indicator indicating the extent to which the opponent perceives a sound emitted from an object operated by the game-player, thereby enabling the game-player to accurately operate an operation object.

DETAILED DESCRIPTION

In the following embodiment to be described, a game device having a data processing function (computer function) executes a game application program such that a game-player can play an electronic game, and the story of the game application program is, in summary, that a ninja aims to infiltrate into enemy facilities without being discovered by the enemy.

Figure 1:
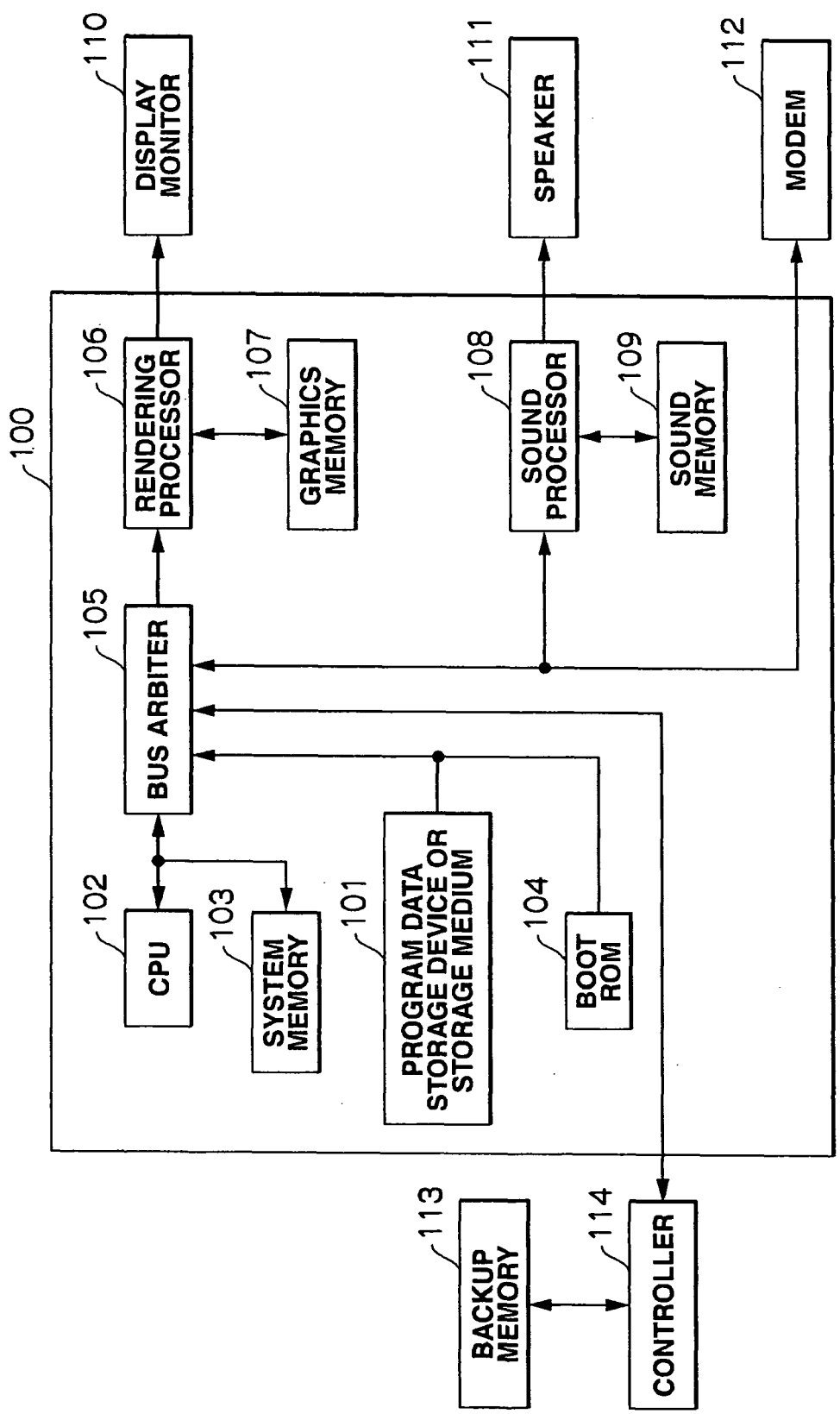
FIG. 1 is a block diagram of an electronic game device according to an embodiment of the present invention.

First, the configuration of the game device is described. FIG. 1 is a block diagram of an electronic game device according to the present invention. A game device 100 is provided with: a program data storage device or a storage medium (including for example an optical disk and optical disk drive, and a flash memory) 101 in which a game program and data (including video data and music data) are stored; a CPU 102 for carrying out such tasks as execution of the game program, control of the entire system, and coordinate calculations for image display; a system memory 103 for storing programs and data necessary for the CPU 102 to carry out processing; a boot ROM 104 for storing programs and data necessary when the game device 100 is started up; and a bus arbiter 105 for controlling the flow of programs and data between the various blocks of the game device 100 and externally connected devices, these components being each connected to a bus.

A rendering processor 106 is connected to the bus, and video (movie) data read out from the program data storage device or storage medium 101, as well as images to be generated in response to an operation by the game-player or the progress of the game are displayed on a display monitor 110 by the rendering processor 106. Graphics data and the like necessary for the rendering processor 106 to generate images are stored in a graphics memory (frame buffer) 107.

A sound processor 108 is connected to the bus, and music data read out from the program data storage device or storage medium 101 as well as sound effects and voices to be generated in response to an operation by the game-player or the progress of the game are output from a speaker 111 by the sound processor 108. Sound data and the like necessary for the sound processor 108 to generate sound effects and voice are stored in a sound memory 109.

A modem 112 is connected to the game device 100, and the game device 100 can communicate with other game devices 100 and a network server via a telephone wire (not shown in drawings). The game device 100 is also connected to: a backup memory 113 (including a disk storage medium and storage device) in which information concerning the game at a midway process and program data inputted and outputted via the modem are recorded; and a controller 114 that inputs to the game device 100 information for controlling the game device 100 and externally connected devices in accordance with an operation by an operator. The CPU 102 and the rendering processor 106 constitute an image computation process unit. It should be noted that the units described above as the components of the game device may be provided in other game devices or servers. An electronic amusement system, that is, an electronic amusement device according to the present invention, may be achieved by a game-player's game device terminal and a server.

Figure 2:
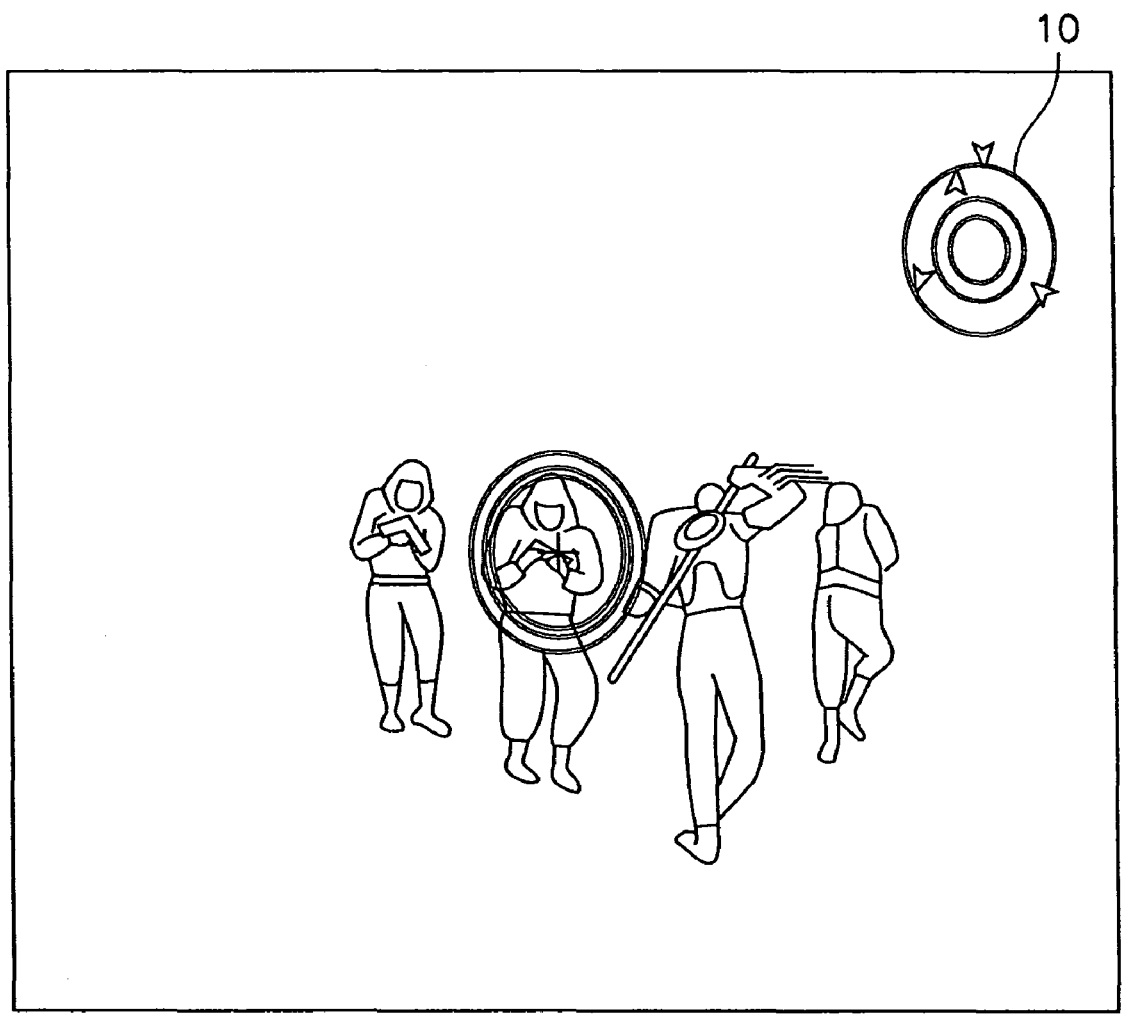
FIG. 2 is one scene of a radar image displayed on a monitor.

FIG. 2 shows one scene of a video image displayed on a monitor, the scene involving a story in which a player character operated by the game-player approaches enemy characters (opponents) while striving not to be noticed and then defeats the enemy characters. The drawing shows a sound radar image (screen) according to the present invention at the upper right thereof. The sound radar screen is distinguished from the center image of the game.

Figure 3:
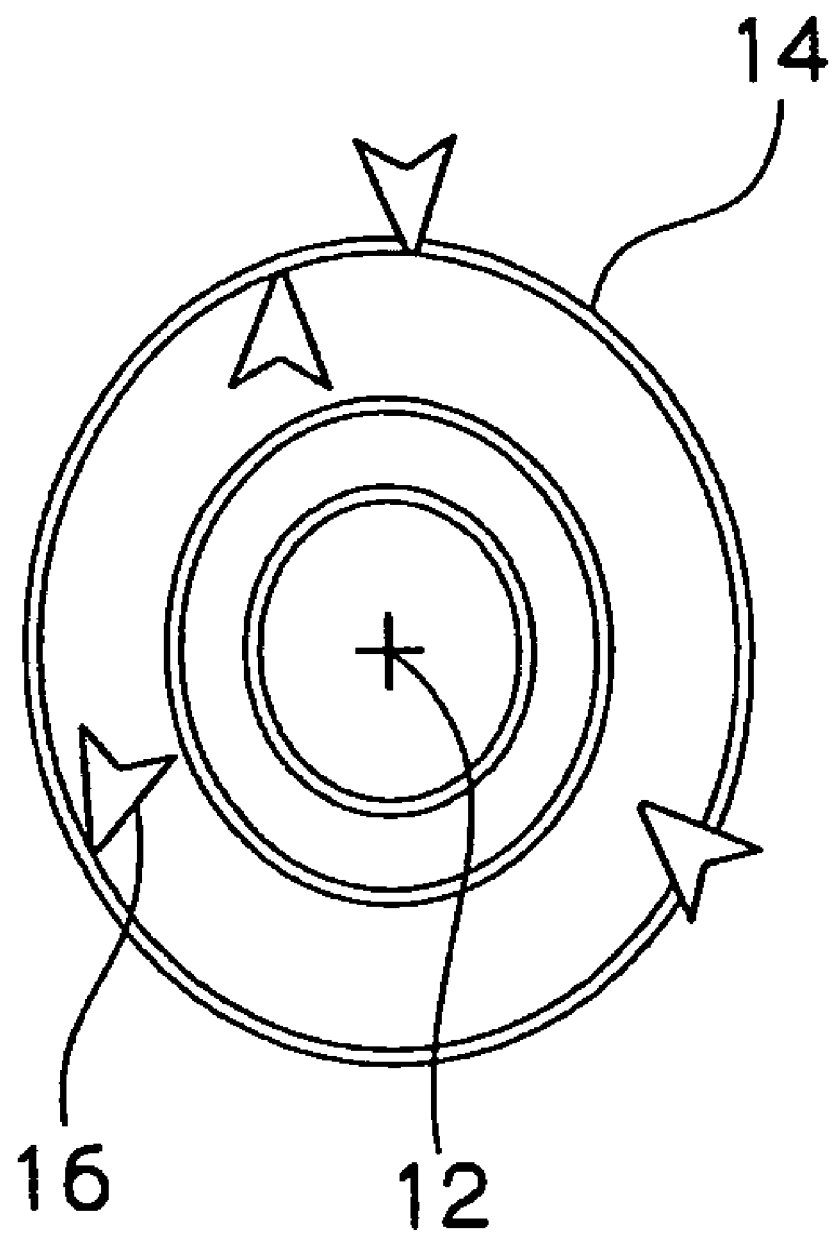
FIG. 3 is a diagram showing a display image in an enlarged manner.

FIG. 3 shows an image of the sound radar screen. A center 12 indicates a sound source and shows a manner in which a ripple 14 of sound from the sound source spreads out while enlarging the circles. Triangle symbols 16 displayed on the sound radar image indicate enemy characters which are defined as enemies of a player character operated by the game-player in the story of the game. The player character and the enemy characters are located in a virtual space (a space of three dimensional coordinates) defined by the game program. In accordance with an operational input from the controller, the player character moves and runs in a predetermined direction and acts so as to carry out a predetermined attack on the enemy characters. The enemy characters are displayed apart from the sound source according to the distance in the virtual space between the sound source and the enemy characters.

Figure 4:
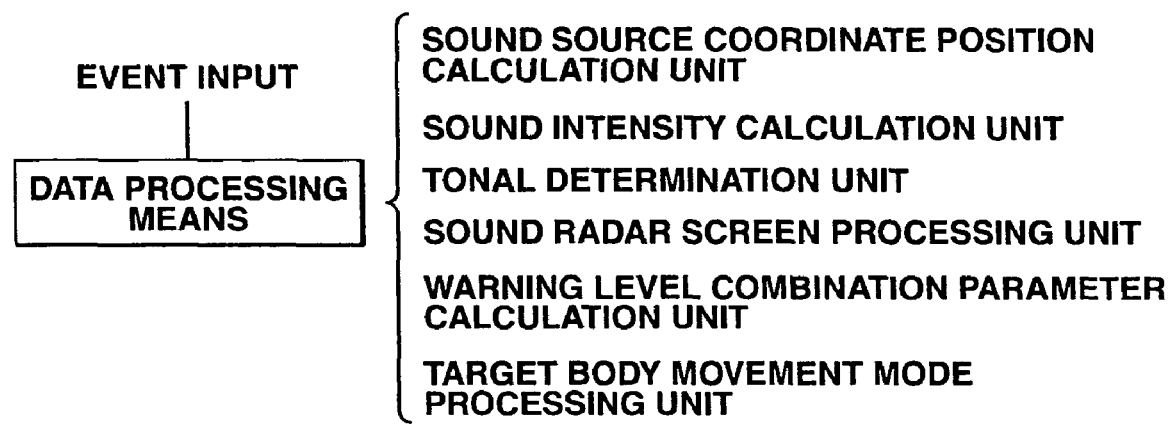
FIG. 4 is a block diagram of data processing means.

The CPU 102, which is one data processing device, achieves data processing means (sound radar image processing means) based on the game program and various types of data. As shown in FIG. 4, the data processing means achieves: a sound source coordinate position calculation unit that calculates the coordinate position of the sound source based on an event input, which is inputted to the game device 100 by the game-player operating the controller; a sound source intensity calculation unit that calculates sound source intensity, that is, the intensity of a sound; a tone determination unit that determines tone; a sound radar screen processing unit that executes processing for generating the sound radar screen and displaying the sound radar on a monitor; a total alarm level parameter calculation unit for target bodies; and a movement mode processing unit for target bodies. Each unit is defined by commands and data of the game application program.

The "event input" refers to data representing commands which are given to the game program via the controller so that the player character runs or jumps. For example, when the player character jumps, a jumping sound is produced, and the sound source coordinate position calculation unit, handling this jump as the sound source, stores the position where the player character jumps as a sound source position in a predetermined region of a memory. Also, the "event" herein can also include events other than those made by the player character itself, e.g., an event in which the player character throws a stone and the stone collides with the ground or a water surface. In this example, a point of collision between the stone and the ground constitutes the sound source coordinates.

Figure 5:
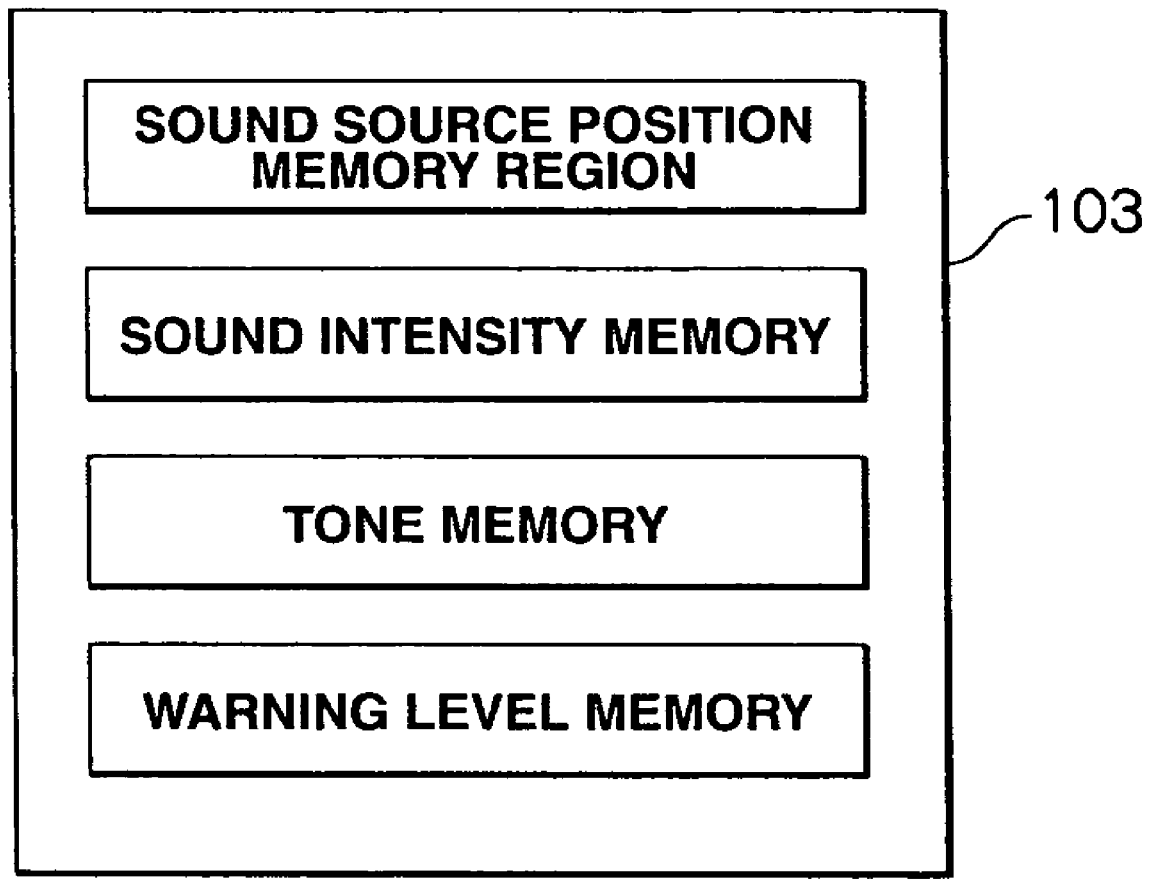
FIG. 5 is a block diagram illustrating storage areas of a system memory.

FIG. 5 is a block diagram showing regions of the system memory 103, in which position information relating to sound sources is stored in a sound source position memory region. Based on predetermined arithmetic expressions, the sound intensity calculation unit calculates the intensity of sound based on event input information and other data (such as the player character's speed and the characteristics of the surface on which the player character is present, for example, whether it is a floor surface where sound is likely to be produced or a grass field surface where sound is unlikely to be produced). The sound intensity is stored in a sound intensity memory shown in FIG. 5.

The sound radar screen processing unit generates the sound radar screen shown in FIG. 3. The maximum reachable range of a sound is defined by the maximum distance from a sound source based on the intensity of the sound. Data and parameters necessary for generating the sound radar screen are stored in the game program. The tone determination unit determines the tone of sound produced from the sound source, for example a sound of a person running, a sound of water splashing, or a metallic sound, and stores the tone in a memory. Tone and sound intensity are examples of the characteristics of sound.

The total alarm level parameter calculation means are means for calculating the level of an alarm which sound produced from a sound source gives to enemy characters. The "alarm level" corresponds to a level at which a sound is perceived by an opponent character. The alarm level is defined by parameters. As shown in FIG. 5, the parameter values are temporarily stored in the system memory.

The alarm levels, being the level of sense of alarm that the enemy characters feel, include, for example, inattention (normal), cautiousness (attentive), vigilance (investigating), and assurance (attacking). The "inattention" refers to a state in which the enemy character does not need to react even when there is a sound, the "cautiousness" refers to a state in which the enemy character needs to turn its face toward a sound, the "vigilance" refers to a state in which the enemy character needs to advance toward a sound, and the "assurance" is a state in which the enemy character needs to fire a weapon toward a sound source. As described above, the movement modes of enemy characters are determined based on the total parameter values of alarm levels. The total parameter values of alarm levels and the movement modes (motion data of the enemy characters) are defined in, for example, a table format in the game program.

The total parameters of alarm levels are defined for example by multiplying a parameter "a" relating to a sound intensity by a parameter "b" relating to a tone. Higher parameter values are set for higher sound intensities, and higher parameters are set for sounds with tones that are recognized by the enemy more easily (e.g., a sound of an explosion). The sound intensity should be determined at the position of the enemy character and the sound intensity is calculated by attenuating the initial intensity of a sound from a sound source in accordance with the position of the sound source and the position of the enemy character.

By providing on the sound radar screen processing unit the movement modes of enemy characters according to alarm levels, the symbols of enemy characters move in the determined modes on the sound radar screen. At this time, the colors of the triangular symbols of the enemy characters may be changed in accordance with the alarm levels. The total alarm level parameter values become higher for enemy characters that are closer to the sound source.

Figure 6:
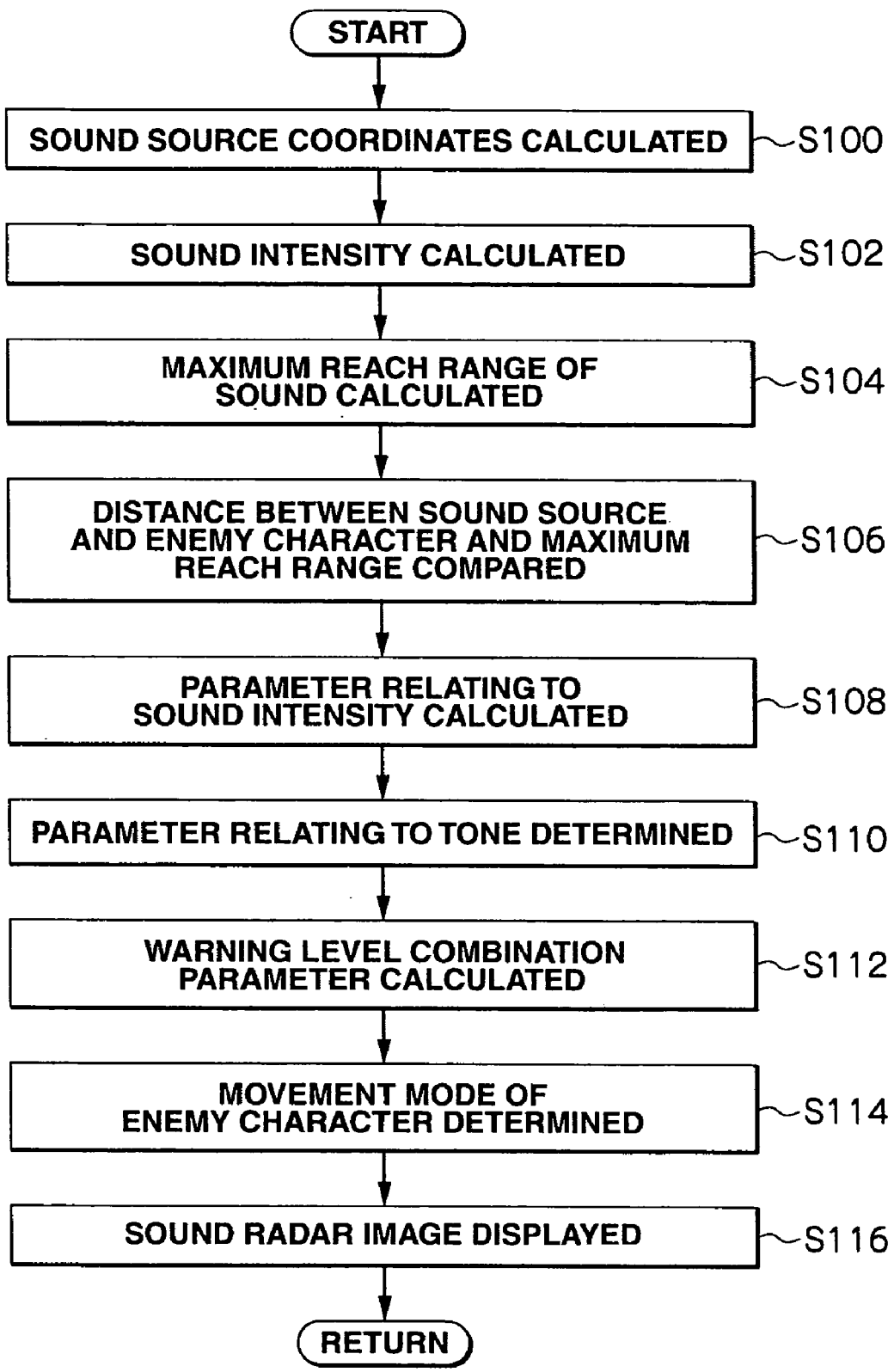
FIG. 6 is a flow chart showing display operations for a radar image.

Next, data processing operations executed by the data processing device is described according to a flowchart shown in FIG. 6. First, when the game program starts, the CPU 102 calculates the position coordinates of a sound source in the virtual space (S100).

Then the intensity of the sound generated from the sound source is calculated (S102). Next, the maximum reachable range of the sound is calculated based on the intensity of the sound at the sound source (S104). The maximum reachable range of a sound is defined using a spherical surface. Then the distance between the position of the enemy character and the sound source is calculated and this distance is compared to the diameter of the maximum sphere defining the maximum reachable range (S106). This comparison is repeated for all the characters that should be displayed on the sound radar.

For each enemy character inside the spherical surface, the initial intensity at the sound source is attenuated based on the distance between the enemy character and the sound source, and then a parameter value (parameter "a") relating to the sound intensity is calculated based on the attenuated value (S108). At S110, the tone of the sound produced from the sound source is determined and a parameter value (parameter value "b") relating to the tone is determined. Based on these parameters, e.g., by multiplying these parameters, the total parameter values are calculated (S112). Based on the total parameter values, the alarm level of each enemy character inside the spherical surface is selected from multiple stages in the table stored in the game program. Then the movement mode of each enemy character is determined in accordance with the selected stage of alarm level (S114).

The action of each enemy character is selected based on the movement mode. It should be noted that even when the calculation result indicates that sound is perceivable to enemy characters, if the tone of such sound does not give sense of alarm to the enemy characters, the level of parameters indicating the alarm level is set low.

At S116, data processing is executed to create a sound radar image and the sound radar image is displayed on the screen. The maximum reach position of the ripple of sound has been determined in S104. In the video image of the ripple of sound spreading out, the diameters of the circles constituting the ripple increase for each frame. Relative positions of the target bodies relative to the sound source coordinates are calculated and symbols of the respective target bodies are displayed on the sound radar image. The symbols of the target bodies are displayed outside the maximum reachable range of the sound. Since sound does not reach these target bodies, the alarm levels of the target bodies have low parameter values. On the other hand, the parameter values of target bodies closer to the sound source have higher numerical values.

The above-described embodiment provides, for example, the following advantages to a game-player as compared to conventional radar displays. Since the game-player can judge whether or not a sound is perceived by opponents, the game-player can be more careful in the operation of the player character he is operating. The game-player can quickly detect whether or not a sound source is perceived by opponents and can swiftly take a suitable action.

It should be noted that the intensity of sound (a sound volume) can be conveyed to the game-player by, for example, displaying numerical values on the sound radar image and changing the colors of circles constituting the ripple of sound. Also, the sound intensity and the propagation state of sound may be corrected in accordance with the environment of the virtual space (the atmospheric temperature and geographical features, etc). Furthermore, sound may be attenuated by a predetermined value for each frame. In this case, a location where the sound intensity becomes zero defines the maximum reachable range of the sound. Furthermore, a display of tone can be added to the radar image. The color or shape (a thick line, a thin line, etc.) of the ripple (circles) of sound may be changed.

It should be noted that a typical example of sound, which is defined as a sound source, is sound caused by an action of the player character. Naturally occurring sounds (such as sounds caused by a movement of an animal and a collapse of a rock) may be defined as sound sources as needed. For example, if enemy characters run towards a sound produced by a movement of an animal, it is possible to create a condition in which for the player character will not be easily discovered by the enemy characters.

In the present invention, "sound source information," which indicates the type of sound produced when a certain event has occurred, refers to information including: the type of a sound source itself that produced the sound (e.g., a sound produced by the player character, a warning sound or phrase produced by an enemy and a game object such as a bomb); the meaning which the relevant sound indicates in the game (e.g., a warning sound and an ordinary phrase); the type of action that produced the sound (e.g., a walking sound, sound produced by the movement of a sword and sound of a weapon hitting walls); and the like, and "propagation mode information" of sound refers to information that is not a realistic simulation of an actual sound but that can be set arbitrarily by the game maker, such as intensity (volume), reachable range, reach speed, and image data for displaying the propagation mode on the radar screen.

Also, the sound characteristics information does not have to be set for all events which potentially produce sounds in the game. For example, assuming that a sound of a certain event is set so that it does not affect the actions of the enemy but produces another sound which results from the certain event and which affects the actions of the enemy (e.g., a sound of a throwing star being thrown (a sound effect is actually emitted)) in the game, the original sound can be set so as to be excluded from the definition of "sound characteristics information." By setting the sound characteristic information as described above, the sound of the throwing star being thrown is not displayed on the sound radar and the enemy does not react to the "sound of the throwing star being thrown" regardless of the conditions in the game.

Further, if the throwing star hits a wall or the like, the resulting impact sound is defined as "sound characteristics information (the location of impact is set as the sound source position coordinates)." Accordingly, when the throwing star hits a wall or the like, sound waves originating from the location of impact and spreading out therefrom are shown on the sound radar and enemies within the reachable range can react to the impact sound in such a way that they increase their alarm levels or change their viewing field ranges toward the position where the impact sound occurred.

INDUSTRIAL APPLICABILITY

The present invention can be applied to an electronic amusement device.

The invention claimed is:

1. A data processing method performed in a video game device for providing a video game in which an action and a position of a player character in a virtual space is determined based on an event signal from an input device, such that a game is generated and displayed on a display, the game image including a radar image which indicates a positional relationship between the player character and an object positioned within a predetermined distance from the player character, the method comprising:

detecting, by the video game device, the event signal from the input device, and determining sound characteristic information and an effect sound based on the event signal;

identifying, by the video game device, a first sound source position in the virtual space based on a current action and a position of the player character based on the event signal;

determining, by the video game device, a propagation mode based on the sound characteristics information and the first sound source position, the propagation mode including at least one of a reachable range of the effect sound, an intensity of the effect sound depending on a distance from the sound source position, and a propagation speed of the effect sound;

determining, by the video game device, a second sound source position on the radar image based on the first sound source position; and generating, by the video game device, a wave pattern image on the radar image based on the propagation mode and the second sound source position, the wave pattern image indicating a wave pattern of the effect sound spreading out from the first sound source position in the virtual space, and performing control of displaying the wave pattern image on the radar image on the display.

2. The data processing method according to claim 1, further comprising:
arranging an enemy character in the virtual space and controlling an action and position of the enemy character, and displaying on the radar image a symbol indicating a positional relationship in the virtual space between the player character and the enemy character,
obtaining position coordinates information of the enemy character in the virtual space,
judging whether or not the enemy character is present in the reachable range corresponding to the event input based on the position coordinates information of the enemy character, the sound characteristics information, and the first sound source position information, and
changing a parameter relating to an action of the enemy character when the enemy character is present within the reachable range of the sound.

3. A video game device, comprising:
a memory configured to store a game program;
an input device which is manipulated by a game player; and
a data processing device configured to execute the game program for providing a video game in accordance with an event signal from the input device,
wherein the data processing device performs a method, under the execution of the game program, comprising:
defining a sound source and a target in a virtual space;
determining a parameter relating to characteristics of a sound generated by the sound source;
determining a propagation mode based on on a position of the sound source and the sound characteristics, the propagation mode including at least one of a reachable range of the sound, an intensity of the sound depending on a distance from the sound source, and a propagation speed of the sound;
generating a wave pattern image based on the propagation mode, the wave pattern image indicating a wave pattern of the sound spreading out from the sound source in the virtual space;
generating a radar image by overlapping a symbol for the target and the wave pattern image based on a positional relationship between the sound source and the target;
displaying the radar image on a display; and
determining an overlap wave pattern and the target.

4. A device according to claim 3, wherein one of the sound characteristics is a parameter relating to sound intensity.

5. The device according to claim 3, wherein one of the sound characteristics is a parameter relating to sound tone.

6. The device according to claim 3, wherein the method further comprises calculating a sound perception parameter corresponding to a level at which the target perceives the sound source after the determination of overlap is affirmed.

7. The device according to claim 6, wherein the sound perception level parameter is calculated based on a parameter relating to the sound characteristics.

8. The device according to claim 6, wherein the method further comprises determining a movement mode of the target based on the sound perception level parameter value.

9. The device according to claim 6, wherein the method further comprises changing a display mode of a symbol of the target based on the sound perception level parameter value.

10. The device according to claim 3, wherein a symbol of the target on the radar image outside a maximum range to which the sound can be propagated.

11. A data processing method performed in a video game device including a memory configured to store a game program, an input device which is manipulated by a player of the game, and a data processing device configured to execute the game program for providing a video game in accordance with an event signal from the input device, the data processing method comprising:
defining, by the video game device, a sound source and a target in a virtual space;
determining, by the video game device, a parameter relating to characteristics of a sound generated from the sound source;
determining, by the video game device, a propagation mode based on a position of the sound source and the sound characteristics, the propagation mode including at least one of a reachable range of the sound, an intensity of the sound depending on a distance from the sound source, and a propagation speed of the sound;
generating, by the video game device, a wave pattern image based on the propagation mode, the wave pattern image indicating a wave pattern of the sound spreading out from the sound source in the virtual space;
generating, by the video game device, a radar image by overlapping a symbol for the target and the wave pattern image based on a positional relationship between the sound source and the target;
displaying, by the video game device, the radar image on a display; and
determining, by the video game device, an overlap of the wave pattern and the target.

12. A non transitory computer-readable storage medium storing instructions that, when executed by a processor, perform a method comprising:
defining a sound source and a target in a virtual space;
determining a parameter relating to characteristics of a sound generated from the sound source;
determining a propagation mode based on a position of the sound source and the sound characteristics, the propagation mode including at least one of a reachable range of the sound, an intensity of the sound depending on a distance from the sound source, and a propagation speed of the sound;
generating a wave pattern image based on the propagation mode, the wave pattern image indicating a wave pattern of the sound spreading out from the sound source in the virtual space;
generating a radar image by overlapping a symbol for the target and the wave pattern image based on a positional relationship between the sound source and the target;
displaying the radar image on a display; and
determining an overlap of the wave pattern and the target.

* * * * *

UNITED STATES PATENT AND TRADEMARK OFFICE
CERTIFICATE OF CORRECTION

| | | |
|---|---|---|
| PATENT NO. | : 7,850,525 B2 | Page 1 of 1 |
| APPLICATION NO. | : 11/596001 | |
| DATED | : December 14, 2010 | |
| INVENTOR(S) | : Toru Shimizu et al. | |

It is certified that error appears in the above-identified patent and that said Letters Patent is hereby corrected as shown below:

In claim 1, column 8, line 43, "game is generated" should read --game image is generated--.

In claim 3, column 9, line 35, "based on on a" should read --based on a--.

In claim 3, column, 9, line 50, "overlap wave pattern" should read --overlap of a wave pattern--.

In claim 10, column 10, line 8, "image outside" should read --image is outside--.

In claim 12, column 10, line 40, "non transitory" should read --non-transitory--.

Signed and Sealed this
Third Day of May, 2011

David J. Kappos
*Director of the United States Patent and Trademark Office*